June 8, 1954     J. HAGEL     2,680,425
SQUEEZE GATE FOR CATTLE CHUTES
Filed May 26, 1953     2 Sheets-Sheet 1

Jack Hagel
INVENTOR.

June 8, 1954   J. HAGEL   2,680,425
SQUEEZE GATE FOR CATTLE CHUTES
Filed May 26, 1953   2 Sheets-Sheet 2

Jack Hagel
INVENTOR.

Patented June 8, 1954

2,680,425

UNITED STATES PATENT OFFICE 2,680,425

SQUEEZE GATE FOR CATTLE CHUTES

Jack Hagel, Lake Providence, La.

Application May 26, 1953, Serial No. 357,576

2 Claims. (Cl. 119—98)

My invention relates to improvements in squeeze gates for holding cattle by the neck in a cattle chute for branding, dehorning, vaccinating and other purposes.

The primary object of my invention is to provide a gate for the outlet end of a cattle chute which embodies squeeze bars operative by a single hand lever to exert pressure both laterally and downwardly against the neck of an animal to securely confine the animal in the chute.

Another object is to provide a gate in which pressure is exerted against the sides of the neck of the animal by parallel side squeeze bars movable variably against the sides of the neck according to requirements as regards size of the neck of the animal and with selected pressure all by operation of a single hand lever.

Still another object is to provide in such a gate squeeze means for confining either cattle or hogs by the neck in the chute.

Still another object is to provide a gate for a cattle chute embodying means for the above purposes which is easy to operate safe, strong, and adapted for inexpensive manufacture.

Other and subordinate objects will become apparent when the following description and claims are read with reference to the drawings accompanying and forming part of this specification.

Figure 1:
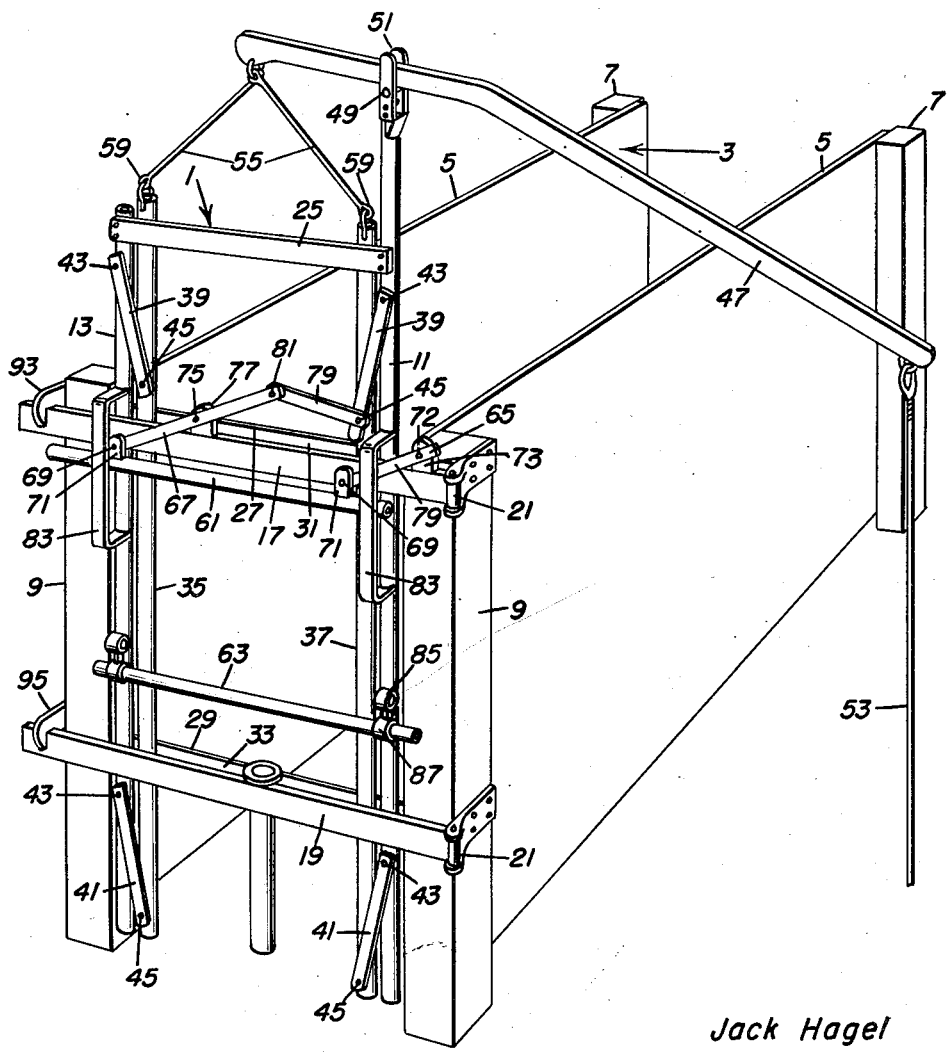
Figure 1 is a perspective view of my improved gate mounted on a cattle chute.
Figure 3:
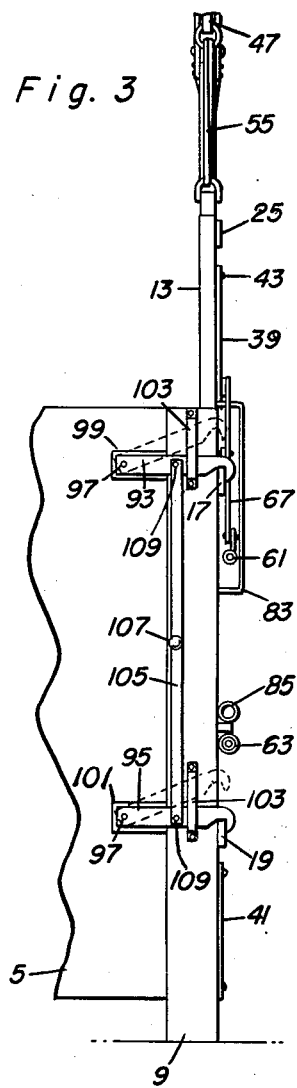
Figure 3 is a fragmentary view in side elevation of the same.

Referring by numerals to the drawings, in the embodiment of my invention illustrated therein 1 designates, as a unit, the squeeze gate of my invention mounted on a conventional cattle chute 3 having parallel side walls 5 suitably supported by pairs of opposite side chute posts 7, 9 at opposite ends of the chute 3, respectively. The posts 9 flank the discharge end of the chute at which my improved gate 1 is mounted.

The gate 1 comprises a pair of upright, relatively long and short side gate posts 11, 13 of tubular metal welded, as at 15, to a pair of upper and lower horizontal gate bars 17, 19 hinged at corresponding ends thereof, as at 21, to one of the chute posts 9 at the discharge end of the chute 3 for horizontal swinging to open and close the gate and extending across said end of the chute. The side gate posts 11, 13 fit in the chute 3 alongside the side walls 5, when the gate 1 is closed, and rise from a point close to the bottom 23 of the chute above said chute for a purpose presently seen.

A cross bar 25 rigidly connects the side gate posts 11, 13 above the chute 3 for reinforcing purposes. A pair of upper and lower horizontal bars 27, 29 suitably fixed to the side gate posts 11, 13 in the rear of and opposite the bars 17, 19 form with said bars 17, 19 a pair of upper and lower horizontal guideways 31, 33 in the gate 1 between the gate posts 11, 13.

A pair of upright side squeeze bars 35, 37 extend loosely through the guideways 31, 33 between the side posts 11, 13. The squeeze bars 35, 37 extend above the chute 3 and are movable vertically and laterally in the guideways 31, 33 for a purpose presently seen. The squeeze bars 35, 37 are suspended from the side posts 11, 13 by means of upper and lower pairs 39, 41 of suspension links converging downwardly in each pair with upper ends pivoted, as at 43, to the gate posts 11, 13 and lower ends pivoted, as at 45, to the squeeze bars 35, 37 so that upper and lower links of the pairs 39, 41 form parallel link motions at opposite sides of the gate 1 operating when the squeeze bars 35, 37 are moved upwardly and downwardly to swing said squeeze bars 35, 37 toward and from each other parallel into and from squeezing relation to the sides of a cow's neck interposed between said posts 35, 37.

Lifting means is provided for moving the squeeze bars 35, 37 upwardly and comprises a vertically swingable hand lever 47 pivoted intermediate its ends as at 49 in a fork 51 on the longer gate post 11, said lever extending crosswise of and outwardly over the chute 3 with an operating pull cable 53 on one end and a pair of lift rods 55 depending from and pivoted at upper ends thereof, as at 57, to its other end, the lower ends of said rods 55 being pivoted as at 59 to the upper ends of said squeeze bars 35, 37.

Between the gate bars 17, 19 a pair of neck confining, horizontal upper and lower bars 61, 63 are provided on the gate 1 and which extend across the side squeeze bars 35, 37 for confining the neck of the cow against vertical movement. The upper bar 61 is mounted for vertical movement downwardly and upwardly into and from pressing engagement with the neck of the cow by means of a link 65 and a lever 67. The link 65 and lever 67 are pivoted at corresponding ends thereof, as at 69, to ears 71 on said bar 61 adjacent opposite ends of said bar, the link 65 being pivoted at its other end, as at 72 to an ear 73 on the hinged end of the upper gate bar 17 and the lever 67 being pivoted between its ends, as at 75, on a central ear 77 on said bar 61, the arrangement being such that said link 65 and lever 67 form a parallel link motion suspending the neck confining bar 61 and swingable vertically in opposite directions, respectively, to raise and lower said bar 61 and maintain the same horizontal by swinging of the lever 67 in opposite directions.

The lever 67 is adapted to be swung in opposite directions when the side squeeze bars 35, 37 are moved laterally toward and from each other by means of an operating connection comprising a link 79 pivoted at opposite ends thereof to one link 39 of the upper pair by the pivot of said one link and having its other end pivoted, as at 81, to the end of the lever 67 on the opposite side of the pivot 75 from the pivot 69 of said lever.

A pair of vertical guides 83 on the gate posts 11, 13 coact with said posts to guide the upper neck confining bar in its movement.

The lever neck confining bar 63 is vertically adjustable by sliding the same into upper or lower pairs of keeper sleeves 85, 87 on the gate posts 11, 13.

The lower gate bar 19 and bar 29 are spaced at a height from the bottom 23 of the chute 3 to accommodate thereunder the average size hog. A removable pin 89 is inserted downwardly in a central socket 91 in the guideway 33 to prevent hogs from casually passing under said bars 19, 29.

Latch means is provided for retaining the squeeze gate 1 closed comprising a pair of vertically swingable hooked catch bars 93, 95 pivoted, as at 97, on brackets 99, 101 on one of the chute posts 9 for downward swinging to hook over the free ends of the gate bars 17, 19 for latching the gate and swinging upwardly to unlatch said gate, said catch bars 93, 95 being guided by keeper bars 103 on said chute post 9. A link 105 with a latch operating hand grip 107 therein is pivoted to the catch bars 93, 95, as at 109, for operating said latch means.

Figure 2:
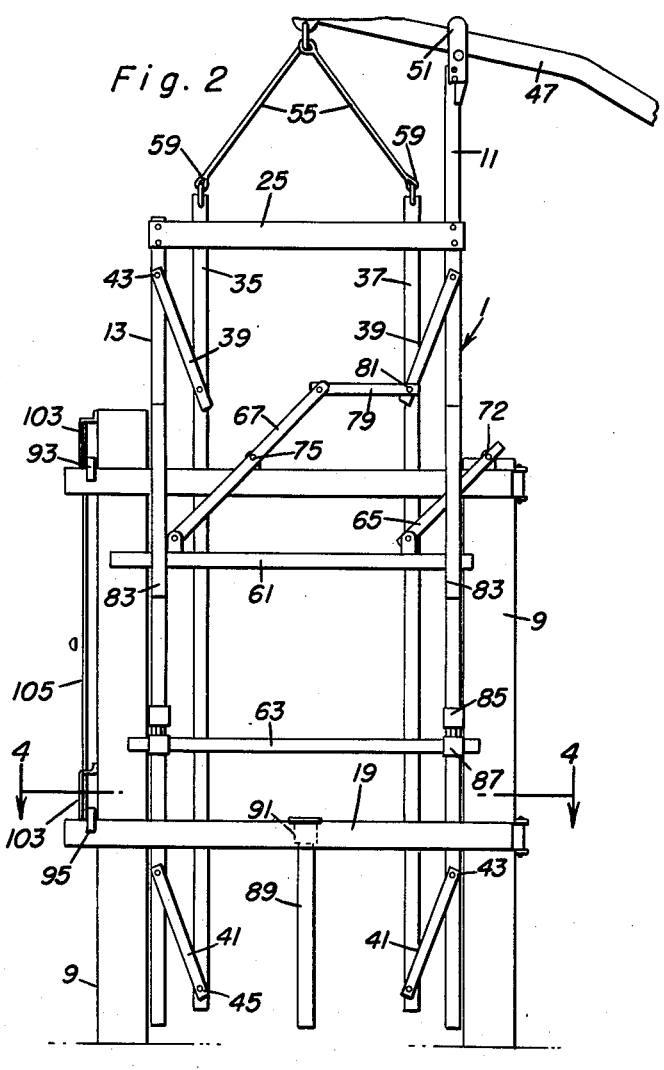
Figure 2 is a view in front elevation illustrating the manner in which the squeeze means is operated.
Figure 4:
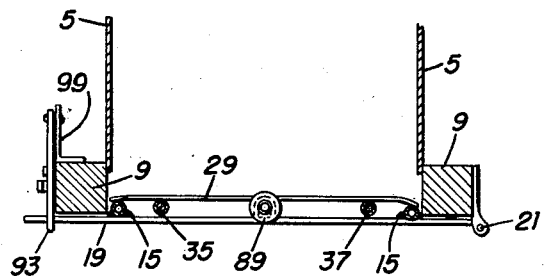
Figure 4 is a fragmentary view in horizontal section taken on the line 4—4 of Figure 2.

Referring now to the operation of my improved gate 1, normally the side squeeze bars 35, 37 gravitate downwardly to rest on the bottom 23 of the chute 3 and are thereby separated the maximum distance apart, and the upper neck confining bar is held in an uppermost position by the link 79 and lever 67 and spaced a maximum distance from the lower neck confining bar 63, all as shown in Figure 1. With the neck of a cow, steer or the like, not shown, inserted between the side squeeze bars 35, 37 and beneath the upper neck confining bar 61 a pull on the cable 53 will rock the lever 47 to lift the side squeeze bars 35, 37 which will cause the pairs of links 39, 41 to swing upwardly thereby moving said squeeze bars toward each other parallel toward neck squeezing position as shown in Figure 2. At the same time the link 79 will be moved bodily by its pivotal connection 45 with the squeeze bar to exert endwise thrust against the lever 67 to swing the same in one direction to cause the upper neck confining bar 61 to be lowered, as shown in Figure 2, against the neck of the animal by the parallel link motion formed by the link 79 and said lever 67. Thus the animal's neck will be confined against lateral and vertical movement. As will be clear the side squeeze bars 35, 37 and the upper and lower neck confining bars 61, 63 form a rectangular stock with three sides, or opposite sides and a top movable relatively to enlarge or reduce the size of the stock for neck squeezing and releasing purposes. By removing the pin 89 the lower ends of the side squeeze bars 35, 37 and the lower gate bar 19 may be used to confine a hog's neck below said bar 19.

The foregoing will, it is believed, suffice to impart a clear understanding of my invention.

Manifestly the invention is susceptible of modification without departing from the inventive concept and right is herein reserved to all modifications falling within the scope of the appended claims.

Having described the invention, what is claimed as new is:

1. A squeeze gate for the discharge end of a cattle chute comprising a pair of side gateposts, a pair of vertical side squeeze bars between said posts upwardly movable, a lever pivoted on said chute for vertical swinging, means operatively connecting said lever to said squeeze bars for upward movement of said squeeze bars by swinging of said lever, and pivoted means suspending said squeeze bars from said gateposts and swinging under upward movement of said squeeze bars to move the squeeze bars toward each other, said pivoted means comprising parallel link motions for each side squeeze bar, said gate further comprising a horizontal bar, a parallel link motion suspending said horizontal bar for downward movement, and means operatively connecting one of the side squeeze bars to said last named parallel link motion.

2. A squeeze gate according to claim 1, said last named parallel link motion comprising a pivoted lever, and a link pivoted to said lever and said one side squeeze bar.

References Cited in the file of this patent

UNITED STATES PATENTS

| Number | Name | Date |
| --- | --- | --- |
| 1,799,073 | Thompson | Mar. 31, 1931 |
| 2,113,741 | Peterson | Apr. 12, 1938 |
| 2,234,366 | Carter | Mar. 11, 1941 |
| 2,308,213 | Shearer | Jan. 12, 1943 |
| 2,587,318 | Hively | Feb. 26, 1952 |
| 2,591,191 | Osmetti | Apr. 1, 1952 |